(No Model.)

T. KELLEY & C. H. HARPER.
MACHINE FOR CUTTING GRAIN.

No. 262,051. Patented Aug. 1, 1882.

WITNESSES:
A. P. Grant
W. F. Kircher

INVENTORS:
Thos. Kelley,
Chas. H. Harper,
BY John A. Wiedersheim,
ATTORNEY.

N. PETERS, Photo-Lithographer, Washington, D. C.

UNITED STATES PATENT OFFICE.

THOMAS KELLEY AND CHARLES H. HARPER, OF PHILADELPHIA, PA.

MACHINE FOR CUTTING GRAIN.

SPECIFICATION forming part of Letters Patent No. 262,051, dated August 1, 1882.

Application filed October 22, 1881. (No model.)

*To all whom it may concern:*

Be it known that we, THOMAS KELLEY and CHARLES H. HARPER, both citizens of the United States, residing in the city and county of Philadelphia, State of Pennsylvania, have invented a new and useful Improvement in Machines for Cutting Grain, which improvement is fully set forth in the following specification and accompanying drawings, in which—

Figure 1:
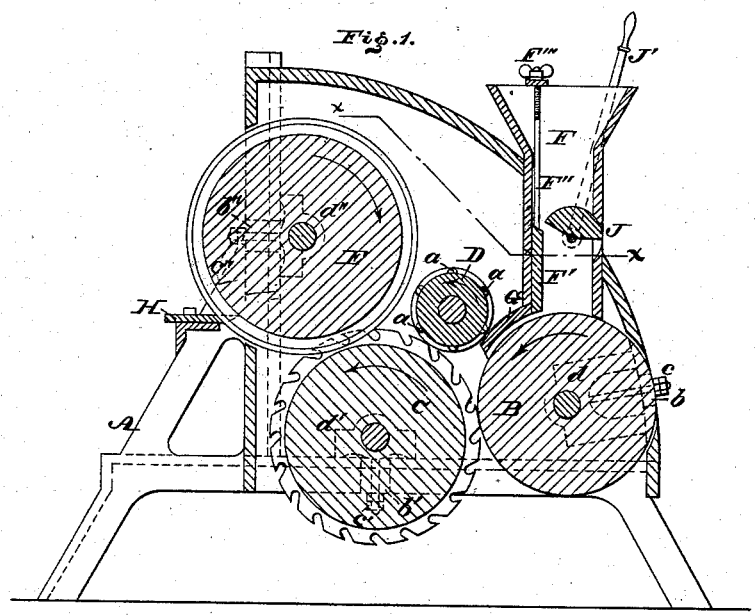
Figure 2:
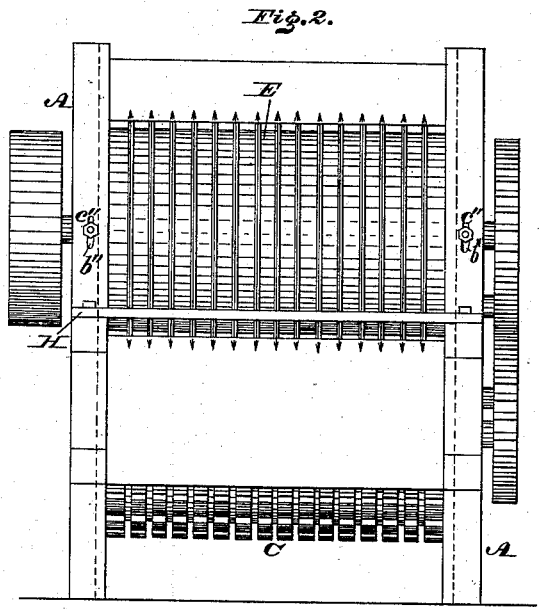
Figure 3:
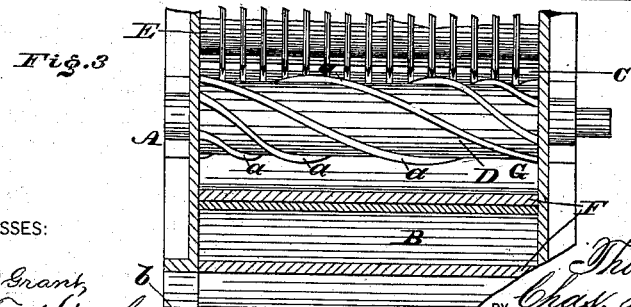

Figure 1 is a central longitudinal vertical section of the machine embodying our invention. Fig. 2 is a rear end view thereof. Fig. 3 is a horizontal section of a portion in line $x$ $x$, Fig. 1.

Similar letters of reference indicate corresponding parts in the several figures.

Our invention, relating to a machine for cutting or reducing grain, consists of a feeding-cylinder, a carrying-cylinder, and a cutting-cylinder, in combination with a spiral cylinder.

It also consists of a hopper having a gate for adjusting the flow of grain from said hopper, and a valve adapted for shutting off and letting on the supply of grain without disturbing the adjustment of said gate.

It also consists of feeding and carrying cylinders and a laying and guarding cylinder, in combination with a guarding-block.

It also consists of the combination of feeding and carrying cylinders, a cutting-cylinder, and clearers.

It also consists of cylinders and their bearings, in combination with the casing having segmental, horizontal, and vertical slots, bolts, and tightening-nuts, whereby advantages are derived, as will be hereinafter fully set forth.

Referring to the drawings, A represents the casing of the machine, on which are mounted horizontally-arranged rollers or cylinders B C D E, which are properly geared in order that said cylinders will rotate in the direction of the arrows, Fig. 1. The cylinder B is located below the hopper F and is the feeder. The cylinder C is formed of a series of disks separated one from the other by washers or other suitable means, and the periphery of the disk is grooved or notched at intervals for the reception of the grain which is fed by the cylinder B, and adapted to enter the notches or grooves of the disks, the cylinder C being contiguous or adjacent to the cylinder B. The cylinder D is located above the cylinder C and approaches the cylinder B, the surface of said cylinder D having secured to or formed with it spiral brushes, beads, or ribs $a$, which extend from end to end of said cylinder. The cylinder E is formed of circular blades separated by washers or other means, the cylinder being so disposed that the cutting-edges of its blades enter the spaces between the notched disks of the cylinder C.

G represents a block or guard which extends horizontally and transversely above the cylinder B, adjacent to the cylinder D, and is supported on the casing or frame thereof in any suitable manner, and so located that when the grain leaves the hopper it is permitted to pass between the guard G and cylinder B. When the grain reaches the roller B it is directed to the periphery of the cylinder C, and caused to drop into the grooves or notches thereof, and so is carried toward the cutting-cylinder. Some of the grain will set irregularly in the grooves or notches of the cylinder C, and when it reaches the cylinder D the spiral surface thereof imparts lateral motion to such grain and straightens it out, as it were, so that it lies horizontally and flat in the grooves and notches, and thus is presented at a right angle to the blades of the cutting-cylinder, whereby it is cut true and uniform and without flouring to any appreciable extent. Furthermore, the cylinder D prevents overfeeding of grain to the cylinder C, and injury to the grain, as any excess of grain that is taken up by the cylinder C is forced back by said cylinder D, and so prevented from passing to the cutting-cylinder. The grain, which may be set back by the cylinder D, or otherwise collects below the same, is prevented from crowding back over and clogging the feeding-cylinder, owing to the guard G, and thus the proper feeding action of the cylinder B is not interfered with.

The casing of the machine has in its sides segmental slots $b$ for the reception of the bolts $c$ of the bearings $d$ of the cylinder B, horizontal slots $b'$ for the reception of the bolts $c'$ of the bearings $d'$ of the cylinder C, and vertical slots $b''$ for the reception of the bolts $c''$ of the bearings $d''$ of the cutting-cylinder E, the several bolts having nuts for tightening purposes.

By these provisions the cylinder B may be moved radially and vertically, and thus set or adjusted with respect to the cylinder C, the hopper F, guard G, and cylinder D. The cylinder C may be adjusted horizontally with respect to all of the other cylinders, and the cutting-cylinder may be adjusted vertically with respect to the cylinder C.

H represents a horizontally and transversely extending comb, which is secured to the casing A and adapted to clear and clean the cutting-cylinder of pieces of grain.

The discharge-throat of the hopper is provided with a gate, F', which is adapted to cover and uncover the passage between the guard G and cylinder B, said gate being connected to a rod, F'', which is passed through and guided by a cross-piece secured to the hopper, the upper end of the rod being threaded and provided with a nut, F''', whereby the gate may be adjusted relatively to the amount of grain to be delivered from the hopper, the gate being shown open in Fig. 1. Within the hopper is pivoted a rotatable valve, J, whose pivot or axis is mounted on the sides of the hopper F and fixed to a handle or lever, J', which is conveniently accessible on the outside of the hopper. The valve has a curved upper face or is of segmental form, whereby, when the valve is rotated in order to be opened or closed, its upper face, describing a circle and moving in the grain, prevents the grain from being jammed or clogged in the hopper by said valve. When the valve closes it preferably abuts against the top of the gate F' as a seat, but may abut directly against the side of the hopper.

Having thus described our invention, what we claim as new, and desire to secure by Letters Patent, is—

1. The feeding-cylinder B, carrying-cylinder C, and cutting-cylinder E, in combination with the spiral cylinder D, substantially as and for the purpose set forth.

2. The hopper F and cylinder B, in combination with the adjustable gate F' and the valve J, with the operating-handle J', substantially as and for the purpose set forth.

3. The feeding and carrying cylinders and the laying and guarding cylinder, in combination with the guarding-block G, substantially as and for the purpose set forth.

4. The feeding and carrying cylinders, in combination with the cutting-cylinder and clearers, substantially as and for the purpose set forth.

5. The cylinders B C D E and their bearings, in combination with the casing having segmental slots $b$, horizontal slots $b'$, and vertical slots $b''$, the bolts $c$ $c'$ $c''$, and the tightening-nuts, substantially as and for the purpose set forth.

THOS. KELLEY.
CHAS. H. HARPER.

Witnesses:
JOHN A. WIEDERSHEIM,
A. P. GRANT.